US010952119B2

(12) United States Patent
Wang

(10) Patent No.: US 10,952,119 B2
(45) Date of Patent: Mar. 16, 2021

(54) HANDOVER OPTIMIZATION BASED ON MOBILITY CHARACTERISTICS OF USER DEVICES

(71) Applicant: T-Mobile USA, Inc., Bellevue, WA (US)

(72) Inventor: Jun Wang, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 44 days.

(21) Appl. No.: 16/194,234

(22) Filed: Nov. 16, 2018

(65) Prior Publication Data

US 2020/0162989 A1     May 21, 2020

(51) Int. Cl.
    *H04W 36/32*      (2009.01)
    *H04W 36/00*      (2009.01)
    *H04W 8/08*      (2009.01)

(52) U.S. Cl.
    CPC ........... *H04W 36/32* (2013.01); *H04W 8/082* (2013.01); *H04W 36/0085* (2018.08)

(58) Field of Classification Search
    CPC . H04W 80/04; H04W 36/18; H04W 36/0011; H04W 36/14; H04W 36/08
    USPC .......................................................... 370/331
    See application file for complete search history.

(56) References Cited

U.S. PATENT DOCUMENTS

| 8,644,841 | B1 * | 2/2014 | Oroskar | .......... | H04W 36/00837 |
| | | | | | 455/453 |
| 8,964,695 | B2 * | 2/2015 | Bachmann | ........ | H04W 12/0808 |
| | | | | | 370/331 |
| 2008/0119209 | A1 * | 5/2008 | Upp | ...................... | H04W 68/02 |
| | | | | | 455/458 |
| 2008/0132225 | A1 * | 6/2008 | Ranta | ................... | H04J 11/0093 |
| | | | | | 455/424 |
| 2010/0124926 | A1 * | 5/2010 | Klatt | ..................... | H04W 36/22 |
| | | | | | 455/435.2 |
| 2011/0002304 | A1 * | 1/2011 | Lee | ....................... | H04W 36/02 |
| | | | | | 370/331 |

(Continued)

FOREIGN PATENT DOCUMENTS

WO      2018030859 A1      2/2018

OTHER PUBLICATIONS

European Patent Application No. 19207820.2, European Search Report dated Dec. 2, 2019, 16 pages.

*Primary Examiner* — Peter G Solinski
*Assistant Examiner* — Sanjay K Dewan
(74) *Attorney, Agent, or Firm* — Han Santos, PLLC; John H. Lin

(57) ABSTRACT

A base station of the cellular network receives a history of wireless access of a user device. When the history indicates that the user device is a mobile device, the base station commands the user device to perform a mobility measurement. When the history indicates that the user device is a stationary device, the base station commands the user device to bypass the mobility measurement. The user device is determined to be a mobile device when the history indicates that the user device is wirelessly connected with at least two different base stations within a threshold period of time. The user device is determined to be a stationary device when the history indicates that the user device is connected with the base station and no other base station within a threshold period of time.

20 Claims, 6 Drawing Sheets

(56) References Cited

U.S. PATENT DOCUMENTS

| | | | |
|---|---|---|---|
| 2011/0026484 A1* | 2/2011 | Fox | H04W 60/00 370/331 |
| 2011/0130141 A1 | 6/2011 | Frost et al. | |
| 2012/0100857 A1* | 4/2012 | Belschner | H04W 36/00837 455/436 |
| 2012/0307670 A1* | 12/2012 | Kazmi | H04W 24/10 370/252 |
| 2012/0314675 A1* | 12/2012 | Vujcic | H04L 5/0091 370/329 |
| 2013/0053092 A1* | 2/2013 | Laitinen | H04W 36/32 455/525 |
| 2013/0223403 A1* | 8/2013 | Chen | H04W 36/00837 370/331 |
| 2013/0225169 A1 | 8/2013 | Farnsworth et al. | |
| 2013/0322360 A1 | 12/2013 | Fan et al. | |
| 2014/0094174 A1* | 4/2014 | Diachina | H04W 36/14 455/436 |
| 2014/0243026 A1* | 8/2014 | Essigmann | H04W 68/02 455/458 |
| 2014/0254550 A1* | 9/2014 | Salvador | H04W 36/245 370/331 |
| 2014/0313908 A1 | 10/2014 | Silva et al. | |
| 2015/0237557 A1* | 8/2015 | Alonso-Rubio | H04W 36/32 455/437 |
| 2016/0135247 A1* | 5/2016 | Ozturk | H04W 76/28 455/436 |
| 2016/0360438 A1* | 12/2016 | Yiu | H04W 24/10 |
| 2017/0353989 A1 | 12/2017 | Kim | |
| 2018/0249382 A1* | 8/2018 | Yang | H04W 36/0083 |
| 2019/0174341 A1* | 6/2019 | Chincholi | H04B 17/336 |
| 2019/0387438 A1* | 12/2019 | Chang | H04W 36/0055 |
| 2019/0394662 A1* | 12/2019 | Josan | H04W 24/10 |
| 2020/0022040 A1* | 1/2020 | Chen | H04W 56/001 |

\* cited by examiner

HANDOVER OPTIMIZATION BASED ON MOBILITY CHARACTERISTICS OF USER DEVICES

BACKGROUND

User devices designed to support Internet of Things (IoT) applications aim to achieve low cost and longer battery life. Long-Term Evolution (LTE) category M1 (CAT-M1 or CAT-M) is a wireless technology that allows IoT user devices or user equipment to connect directly with an LTE/4G network without gateway. CAT-M caps the maximum system bandwidth at 1.4 MHz rather than at 20 MHz of CAT-0.

Typical CAT-M user devices may include stationary devices such as utility meters, sensors, and alarm monitors. CAT-M user devices may also include smart watches and tracking devices, which are mobile devices. When a CAT-M user device moves from one place to another, handover operations are performed so that the user device may switch from using one base station to communicate with the LTE network to using another base station to communicate with the network.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Handing over a user device from one base station to another base station of a wireless network involves overhead operations at the network and at the user device. Such overhead operations include the network signaling the user device to perform measurements, and the user device performing repeated measurements and sending reports of the measurements back to the network. These overhead operations increase power consumptions, shorten battery life, and reduce the bandwidth of the network.

This disclosure is directed to techniques of operating a cellular network that reduces the overhead associated with the handover operations of a user device. Specifically, the cellular network determines whether the user device (e.g., a CAT-M user device) is stationary and bypasses handover overhead operations for the user device if the user device is determined to be stationary.

The cellular network decides whether to instruct the user device to perform mobility measurements (also referred to as handover measurements) based on the user device's mobility characteristics. The cellular network determines the mobility characteristics of the user device by tracking the history of the base stations (or cells) accessed by the user device. When the history of the accessed base stations indicates that the user device has been using the same base station to access the cellular network, the cellular network considers the user device as being stationary and bypasses mobility measurements at the user device. Otherwise, the cellular network considers the user device as being non-stationary and instructs the user device to conduct mobility measurements and to report the results of the measurements. By bypassing mobility measurements at stationary devices, the cellular network is able to reduce the overhead associated with the handover operations. The stationary user device is able to reduce power consumption and prolong battery life.

Figure 1:
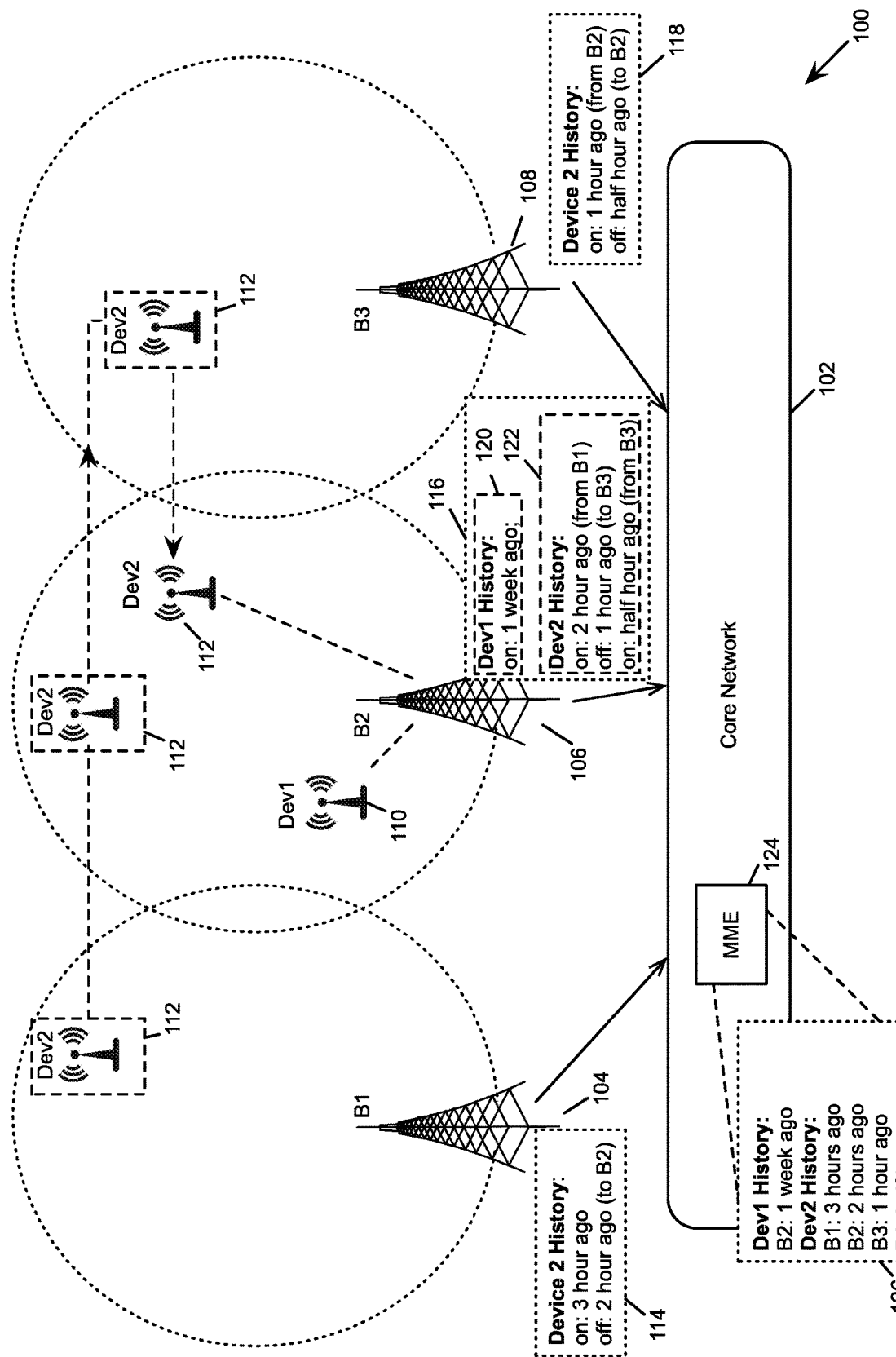
FIG. 1 conceptually illustrates a cellular network that determines whether a user device is a stationary device or a non-stationary device.

FIG. 1 conceptually illustrates a cellular network that determines whether a user device is a stationary device or a non-stationary device. The figure illustrates a cellular network 100. The cellular network 100 includes a core network 102 that interconnects several base stations, including base stations 104 (B1), 106 (B2), and 108 (B2). The base stations provide wireless access to the cellular network 100 so that user devices may access the core network 102 by wirelessly connect with the base stations. The figure illustrates a first user device 110 and a second user device 112. The first user device 110 is stationary and is wirelessly communicating with the core network 102 through the base station 106. The second user device 112 is mobile and is moving from position to position and using different base stations to wirelessly communicate with the core network 102.

The core network 102 includes routers, switches, or other types of data forwarding elements for conducting data traffic (e.g., packet traffic) between various network endpoints such as user devices, base stations, hotspots, and other types of computing resources. The core network 102 also provides access to external networks such as the Internet. The core network 102 may include components that provide services to the subscribers of a cellular network and track positions of the user devices. The core network 102 may include a packet network, e.g., an Evolved Packet Core (EPC) that interconnects different components belonging to an Evolved Packet System (EPS). EPC is a framework for providing converged voice and data on a 4G LTE network. EPC unifies voice and data on an Internet Protocol (IP) service architecture. The EPC allows the operator of the cellular network 100 to deploy and operate one packet network for 2G, 3G, 4G, 5G, wireless local area network (WLAN), and fixed access such as Ethernet, DSL, cable, and fiber.

The user devices 110 and 112 may be smartwatch, embedded computing devices, or any other computing devices that are capable of communicating with other devices via a network. The user devices 110 and 112 may use low-energy consumption modems or transceivers that support lower data communication rates to communicate with the cellular network 100 as LTE CAT-M devices.

The user device 110 is a stationary device. The stationary user device 110 may be a utility meter, a sensor, an alarm monitor, or a device that does not move from place to place in its expected operations. In the example of FIG. 1, the user device 110 does not move (during at least a threshold period of time) and uses only the base station 106 to wirelessly communicate with the core network 102.

The user device 112 is a mobile device. The mobile user device 112 may be, a smart watch, a location tracker device, or another type of device that may move from place to place in its expected operations. In the example of FIG. 1, the user device 112 moves from location to location and has used base station 104, 106, and 108 to wirelessly communicate with the core network 102 at different times (during a threshold period of time).

The base stations 104, 106, and 108 are hotspots of wireless networks. Each of the base stations 104, 106, and 108 may be an Evolved Node B (eNodeB) of a cellular network, such as an LTE network. The base stations 104, 106, and 108 support LTE CAT-M and allow IoT user devices or user equipment to connect directly with an LTE/4G network without gateway. The base stations 104, 106, and 108 also include computing and storage devices that can be used to determine whether a user device connected to a base station is a stationary device or a mobile device.

A user device may simultaneously receive signals from multiple different base stations, albeit at different signal strengths or Signal-to-Noise Ratios (SNRs). A user device that is wirelessly connected to a first base station of the cellular network may be handed over to a second base station if the cellular network determines that, at the user device, the strength or SNR of the signal from the second base station is better than the strength or SNR of the signal from the first base station. A base station may issue a commence measurement command to a user device, and the user device in turn measures the signal strength or SNR of the signal from different base stations and reports the measurements to the base station and to the cellular network. These measurements may be referred to as "handover" measurements as they are used by the cellular network to determine whether to handover the user device from one base station to another base station.

In some embodiments, the cellular network determines whether to conduct mobility measurements at a user device based on whether the user device is a stationary device or a mobile device. These measurements consume power at the user device and the measurement reports use up bandwidth over the wireless medium. The cellular network may conserve power and bandwidth by bypassing mobility measurements at user devices that are determined to be stationary, i.e., user devices that do not switch from base station to base station.

The cellular network may determine whether a user device is stationary or mobile by examining the access history of the user device. Specifically, when the access history indicates that the user device used one base station to access the cellular network in a predetermined period of time, the cellular network considers the user device a stationary device and does not command the user device to conduct mobility measurements. On the other hand, when the access history indicates that the user device has used multiple different base stations to access the cellular network in the predetermined period of time, the cellular network considers the user device a mobile device and commands the user device to conduct mobility measurements.

As illustrated, the base station 104 keeps a wireless access record 114, the base station 106 keeps a wireless access record 116, and the base station 108 keeps a wireless access record 118. The wireless access record of a base station provides a history of accesses by user devices of the base station. The wireless access record 114 indicates that the user device 112 (Dev2) connected with the base station 104 three hours ago and disconnected 2 hours ago. The wireless access record 116 indicates that the user device 112 connected with the base station 106 three hours ago and disconnected 2 hours ago. The user device 110 (Dev1) has been in connection with the base station 106 since a week ago. The wireless access record 118 indicates that the user device 112 connected with the base station 108 an hours ago and disconnected half an hour ago. The wireless access record maintained by a base station may include time stamps of when a user device connects and disconnects with the base station.

The wireless access record of a base station may also identify the source base station that handed the user device over to the current base station, or the destination base station to which the current base station handed the user device over to. For example, the wireless access record 116 of the base station 106 indicates that the base station 104 (B1) handed the user device 112 (Dev2) over to the base station 106 two hours ago, and that the base station 106 handed user device 112 over to the base station 108 (B3) an hour ago.

A base station may extract an access history of a user device based on the wireless access record maintained at the base station. For example, the base station 106 may extract from the wireless access record 116 an access history 120 of the user device 110 (Dev1) and an access history 122 of the user device 112 (Dev2). The base station may use the extracted access history of a user device to determine whether the user device is a stationary devices or mobile devices.

A base station may identify a user device as a stationary device if access history of the user device indicates that the user device has maintained continuous connection with the base station for over a threshold period of time. In the example of FIG. 1, the access history 120 extracted from the wireless access record 116 indicates that the user device 110 (Dev1) has remained in connection with the base station 106 for a week. The base station 106 may use the access history 120 to identify the user device 110 as a stationary device if the threshold period of time is less than a week. The base station 106 may identify the user device 110 as a stationary device even if the user device 110 has not stayed in continuous connection with the base station during that week, as long as the wireless access record 116 or the access history 120 indicates that the user device 110 has not been in connection with another base station during the threshold period of time (e.g., there is no record of the user device 110 being handed over to the base station 106 from another base station during the threshold period.)

On the other hand, a base station may identify a user device as a mobile device if the access history of the user device indicates that the user device is in connection with another base station within a threshold period of time, or the user device has been in connection with the base station for only less than a threshold period of time. In the example of FIG. 1, the access history 122 extracted from the wireless access record 116 indicates that the user device 112 (Dev2) has only been in connection with the base station 106 for about 2 hours. In addition, the access history 122 indicates that the user device 112 was handed over to the base station 106 from another base station 104 (B1) two hours ago. The access history 122 also indicates that the user device 112 was handed over to the base station 108 (B3) an hour ago before coming back to the base station 106. The base station 106 accordingly identifies the user device 112 as a mobile device.

In some embodiments, the wireless access records maintained by different base stations are forwarded to a component or a server in the cellular network. In some embodiments, a Mobility Management Element (MME) 124 of the cellular network receives the wireless access records collected from different base stations. The MME 124 is a core component of the core network 102 that handles paging, authentication, and registration of LTE-compatible user devices with the EPC. The MME 124 may track the positions of the user devices as the user devices move from base station to base station. As illustrated, based on the collected wireless access records 114, 116 and 118, the MME 124 generates a combined access record 126 that includes access histories for user devices 110 (Dev1) and 112 (Dev2). A base station may use the combined access record 126 to determine whether a user device is a stationary device or a mobile device. In some embodiments, the MME 124 uses the combined access record 126 to centrally determine whether a user device is a mobile device or a stationary device.

Figure 2:
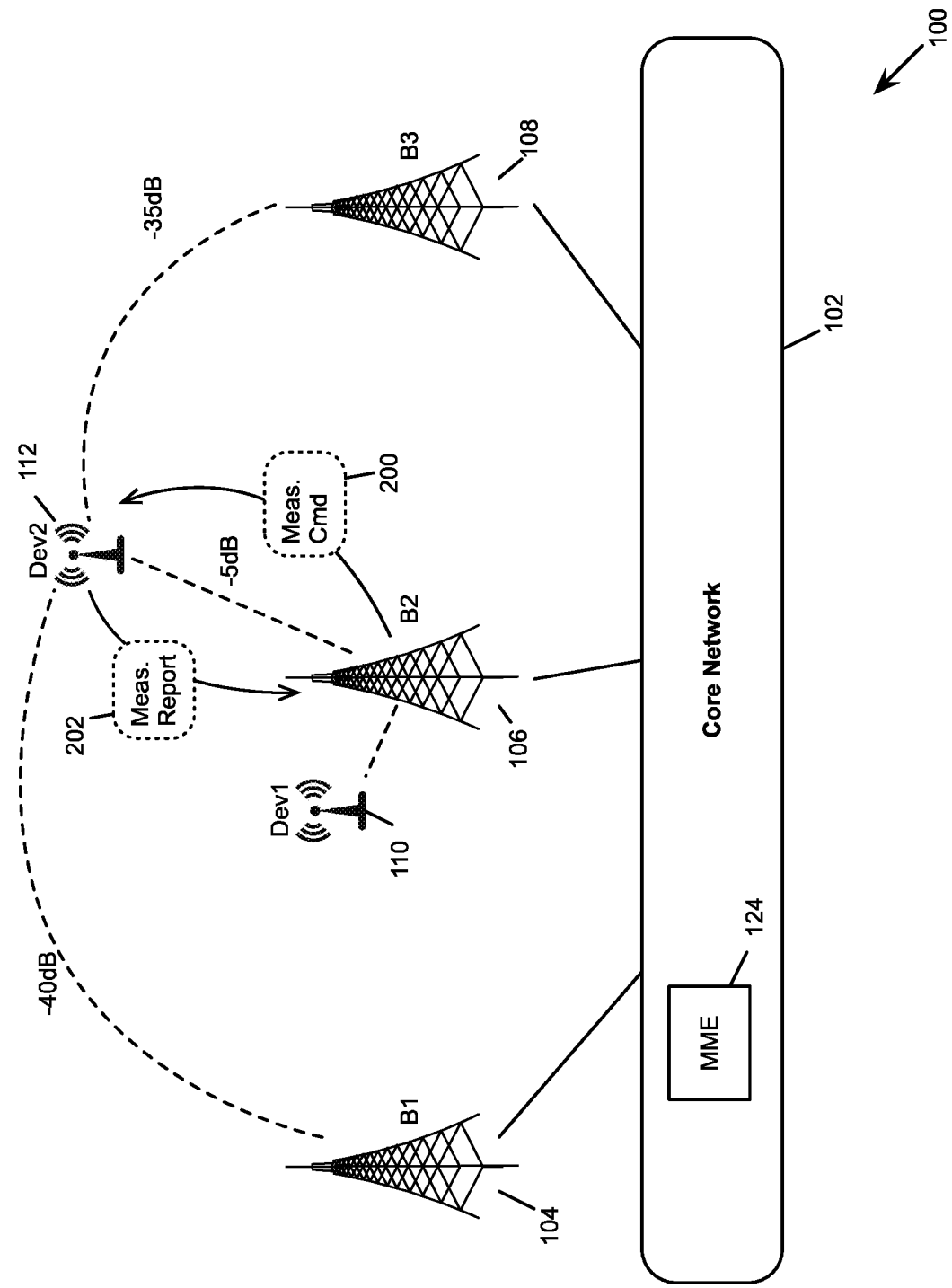
FIG. 2 illustrates a base station commanding mobility measurement for mobile devices while bypassing mobility measurement for stationary devices.

FIG. 2 illustrates a base station commanding mobility measurement for mobile devices while bypassing mobility measurement for stationary devices. In the example, the cellular network 100 has determined that the user device 110 (Dev1) is a stationary device and the user device 112 (Dev2) is a mobile device. The determination of whether a user device is stationary or mobile may be made at the base station 106, which is currently providing wireless access to the cellular network 100 to the user devices 110 and 112. The core network 102 (specifically the MME 124) may also determine whether a user device is stationary or mobile based on the wireless access records collected from different base stations.

In the example, the cellular network 100 or the base station 106 has determined that the user device 110 is a stationary device. Based on this determination, the base station 106 does not command the user device 110 to proceed with mobility measurement. In some embodiments, the base station 106 may issue a command to the user device 110 to bypass or suppress any mobility measurement operations. Consequently, the user device 110 does not measure the signal strengths or SNRs of nearby other base stations and does not report measurements back to the base station 106 or the cellular network 100.

On the other hand, the cellular network 100 has determined that the user device 112 is a mobile device, i.e., the user device 112 is not a stationary device. Based on this determination, the base station 106 issues a command 200 to the user device 112 to proceed with mobility measurements. In some embodiments, the base station 106 allows mobility measurement operations to proceed at the user device 112 by not issuing a command to bypass or suppress any mobility measurement operations. Consequently, the user device 112 periodically measures the signal strengths or SNRs of the other base stations and reports the results of the measurements back to the base station 106 in a report 202.

The cellular network 100 or the base station 106 may use the reported measurements to determine whether to hand the user device 112 over to another base station. In the example, the user device 112 reports that signal strength from base station 104 is −40 dB, the signal strength from the base station 106 is −5 dB, and the signal strength from the base station 108 is −35 dB. The base station 106 may therefore determine that the user device 112 is connected to a base station that has the best signal strength and is not to be handed over to another base station. Conversely, if the report 202 indicates that another base station has a better SNR or signal strength than the base station 106, the base station 106 may commence operations to handover the user device 112 to that other base station.

Example Base Station

Figure 3:
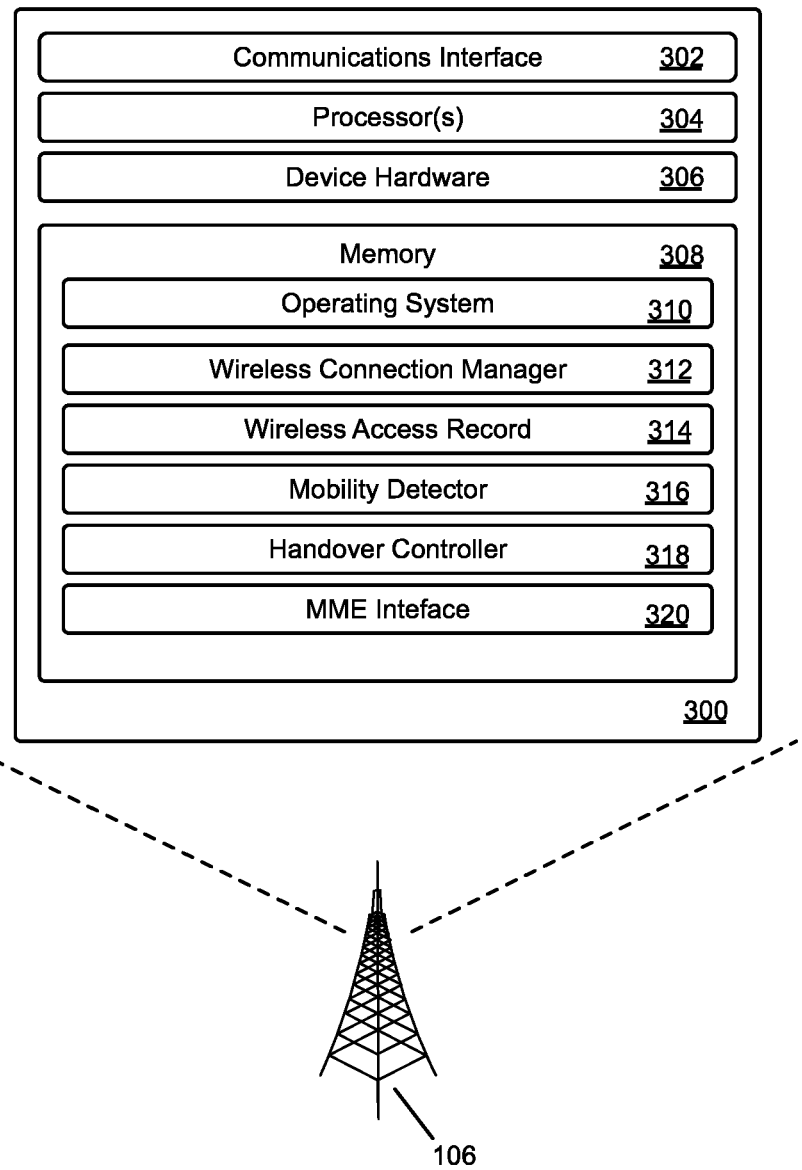
FIG. 3 is a block diagram showing various components of an example computing device implementing a base station that determines whether to instruct a user device to perform mobility measurement based on the user device's mobility characteristics.

FIG. 3 is a block diagram showing various components of an example computing device 300 implementing a base station (e.g., the base station 106). The computing device 300 determines whether to instruct a user device to perform mobility measurements based on the user device's mobility characteristics. The computing device 300 may be a general-purpose computer, such as a desktop computer, tablet computer, laptop computer, server that is capable of receiving inputs, processing the inputs, and generating output data. The computing device may also be a virtual computing device in the form of virtual machines or software containers that are hosted in a cloud.

The computing device 300 may be equipped with a communications interface 302, one or more processors 304, device hardware 306, and memory 308. The communications interface 302 may include wireless and/or wired communication components that enable the computing devices to transmit data to and receive data from other devices, whether through a dedicated wired connection or via a communications network. The device hardware 306 may include additional hardware that performs user interface, data display, data communication, data storage, and/or other server functions.

The memory 308 may be implemented using computer-readable medium, such as a computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store information for access by a computing device. In contrast, communication media may embody computer-readable instructions, data structures, program modules, or other data in a modulated data signal, such as a carrier wave, or other transmission mechanisms.

The processor(s) 304 and the memory 308 of the computing device 300 may implement an operating system 310, a wireless connection manager 312, a wireless access record 314, a mobility detector 316, a handover controller 318, and an MME interface 320. The operating system 310 may include components that enable the computing device 300 to receive and transmit data via various interfaces (e.g., user controls, communications interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The wireless connection manager 312 is a software component that is responsible for receiving data from and sending data to user devices through a wireless network. The wireless connection manager 312 may exchange data with a user device through a radio access network of a cellular network. The wireless connection manager 312 includes software component(s) necessary to integrate CAT-M communication into LTE systems.

The wireless connection manager 312 maintains the wireless access record 314, which is used to track the connections between user devices and the base station. The wireless access record 314 stores connection histories of various user devices that have connected with the base station of the computing device 300. The access history of a user device may include the identity of the user device, the time stamp(s) of when the connection is established (and re-established), and the time stamp(s) of when the connection is severed (and severed again). The wireless access record 314 may also include the identities of source base stations that handed the user devices over to the base station and/or the identities of destination base stations that the base station handed the user device over to. The identities of the source and destination base stations may be downloaded from user devices that are connected with the base station 106 or from the MME 124.

The mobility detector 316 is a software component that uses the wireless access record 314 to determine whether a user device is a stationary device or a mobile device. The mobility detector 316 may identify a user device as a stationary device if the wireless access record 314 shows that user device has maintained continuous connection with the base station for over a threshold period of time. The mobility detector 316 may identify a user device as a mobile device if the wireless access record 314 shows that the user device is in connection with another base station within a threshold period of time, or the user device has been in connection with the base station for only less than a threshold period of time.

The handover controller 318 is a software component that oversees communications with user devices to determine whether a user device should be handed over to another base station. If the mobility detector 316 identifies a user device as a stationary device, the handover controller 318 does not instruct the user device to perform mobility measurement in order to reduce power and bandwidth usage. If the mobility detector 316 identifies a user device as a mobile device, the handover controller 318 may instruct the user device to perform mobility measurement and to report the measurement results. If the reported measurement results indicate that another base station has a better SNR or signal strength than the current base station, the handover controller 318 may commence operations to handover the user device to that other base station.

The MME interface 320 is a software component that exchanges data with the MME 124 in the core network 102. In some embodiments, the MME interface 320 may send packets containing the wireless access record of the base station to the MME 124 so that the MME may assist in determining whether a user device is stationary or mobile by e.g., providing a combined access record.

Example User Device

Figure 4:
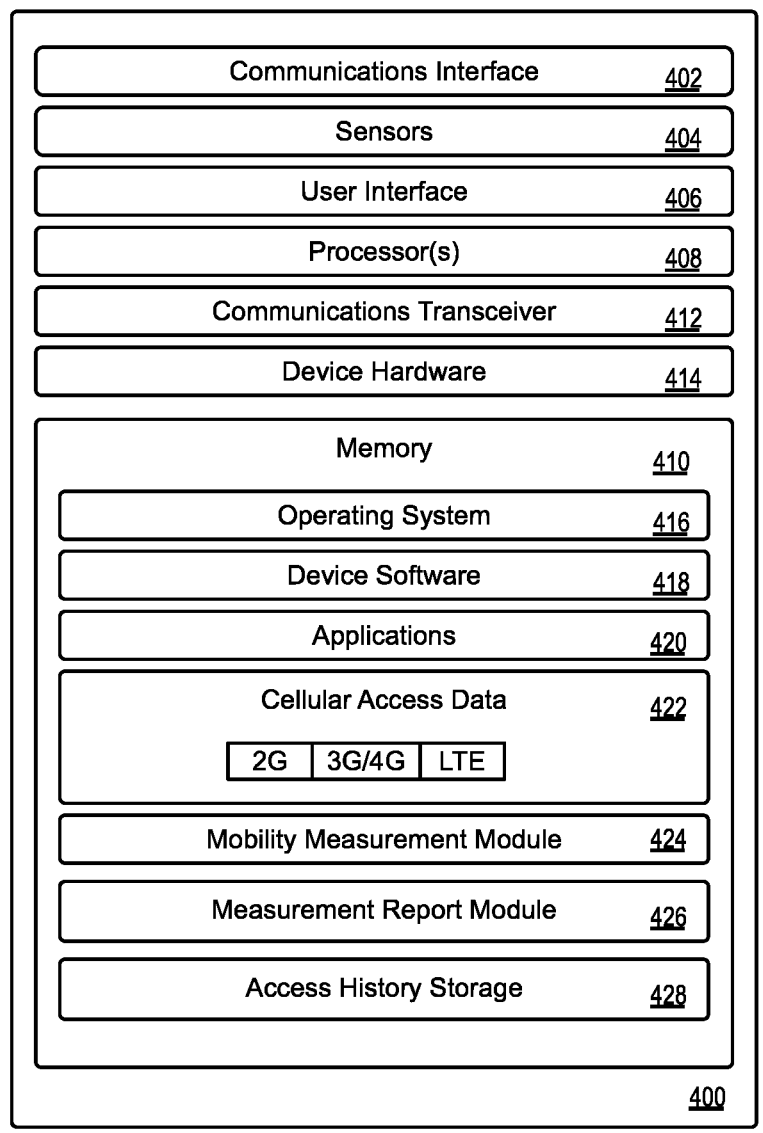
FIG. 4 is a block diagram showing various components of an example user device that may be instructed to perform mobility measurements by a base station, and to report the measurement back to the base station.

FIG. 4 is a block diagram showing various components of an example user device 400 that may be instructed to perform mobility measurements by a base station, and to report the measurement back to the base station. The user device 400 may bypass mobility measurement if the base station does not instruct the user device to perform the mobility measurement, or if the base station instructs the user device to bypass the mobility measurement.

The user device 400 may include a communications interface 402, one or more sensors 404, a user interface 406, one or more processors 408, and memory 410. The communications interface 402 may include wireless and/or wired communication components that enable the user device 400 to transmit or receive voice or data communication over cellular networks and/or Wi-Fi networks.

The sensors 404 may include a proximity sensor, a compass, an accelerometer, altimeter, cameras, and/or a global positioning system (GPS) sensor. The proximity sensor may detect movement of objects that are proximate to the user device 400. The compass, the accelerometer, and the GPS sensor may detect orientation, movement, and geolocation of the user device 400.

The user interface 406 may enable a user to provide input and receive output from the user device 400. The user interface 406 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 410 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The user device 400 may also include communications transceiver 412 and device hardware 414. The communication transceivers are hardware components, such as a modem, that enable the user device 400 to perform telecommunication and data communication with the multiple communication networks. The transceiver 412 may also report signal strengths or SNRs of nearby base stations.

The device hardware 414 may include other hardware that is typically located in a mobile telecommunication device. For example, the device hardware 414 may include signal converters, transceivers, antennas, hardware decoders and encoders, graphic processors, a SIM card slot, and/or the like that enable the user device 400 to execute applications and provide telecommunication and data communication functions. An integrated circuit chip such as a SIM may be inserted into the SIM card slot of the user device 400. Alternatively, an embedded SIM may be hardwired into the circuit board of the user device 400.

The one or more processors 408 and the memory 410 of the user device 400 may implement an operating system 416, device software 418, one or more applications 420, a set of cellular access data 422, a mobility measurement module 424, a measurement report module 426, and an access history storage 428.

The various software and applications may include routines, program instructions, objects, and/or data structures that perform particular tasks or implement particular abstract data types. The operating system 416 may include components that enable the user device 400 to receive and transmit data via various interfaces (e.g., user controls, communications interface 402, and/or memory input/output devices). The operating system 416 may also process data using the one or more processors 408 to generate outputs based on inputs that are received via the user interface 406. For example, the operating system 416 may provide an execution environment for the execution of the applications 420. The operating system 416 may include a presentation component that presents the output (e.g., display the data on an electronic display, store the data in memory, transmit the data to another electronic device, etc.).

The operating system 416 may include an interface layer that enables applications to interface with the communications transceiver 412 and/or the communications interface 402. The interface layer may comprise public APIs, private APIs, or a combination of both public APIs and private APIs. Additionally, the operating system 416 may include other components that perform various other functions generally associated with an operating system.

The device software 418 may include software components that enable the user device 400 to perform functions. For example, the device software 418 may include basic input/output system (BIOS), Boot ROM, or a bootloader that boots up the user device 400 and executes the operating system 416 following power up of the device.

The applications 420 may include applications that provide utility, entertainment, and/or productivity functionalities to a user of the user device 400. The applications 420 may further include electronic mail applications, remote desktop applications, web browser applications, navigation applications, office productivity applications, multimedia streaming applications, and/or so forth. The cellular access data 422 may store credentials for accessing 2G, 3G, 4G, or Long-Term Evolution (LTE) networks.

The mobility measurement module 424 is a software component that controls the mobility measuring operations of the user device. When the user device receives a command to conduct a mobility measurement, the mobility measurement module 424 controls the transceiver 412 to measure the signal strengths or SNRs of nearby base stations. When the user device does not receive such a command, or receives a command to bypass mobility measurement, the mobility measurement module 424 does not control the transceiver to measure signal strengths or SNRs of nearby base stations, and thereby conserve battery power at the user device.

The measurement report module 426 is a software component that generates a report of the results of the mobility measurement. The generated report is transmitted back to the base station. When the user device receives a command to conduct mobility measurement, the measurement report module 426 transmits the report of the results of the mobility measurement to the base station. When the user device does not receive such a command, or receives a command to bypass mobility measurement, the mobility measurement module 424 does not report the results of any mobility measurement, thereby conserving battery power at the user device.

The access history storage 428 is an area of the memory 410 that stores the access history of the user device 400. The access history storage 428 may record the time stamps of when the user device 400 is connected to or disconnected from a base station. The access history storage 428 may also record the identities of the base stations that the user device 400 is or was connected with. If the user device is a mobile device and has been using different base stations to connect to the cellular network, the access history storage 428 stores the identities of base stations that the user device is recently connected with. The content of the access history storage 428 may be provided to the base station to determine whether the user device is stationary or mobile.

Example MME

As mentioned above, the access history of a user device can be used by the base station to determine whether a user device is a mobile device or a stationary device. The access history may come from the base station or the user device. The access history may also come from the MME 124, which receives mobility information of various user devices from different base stations and generates a combined access record.

Figure 5:
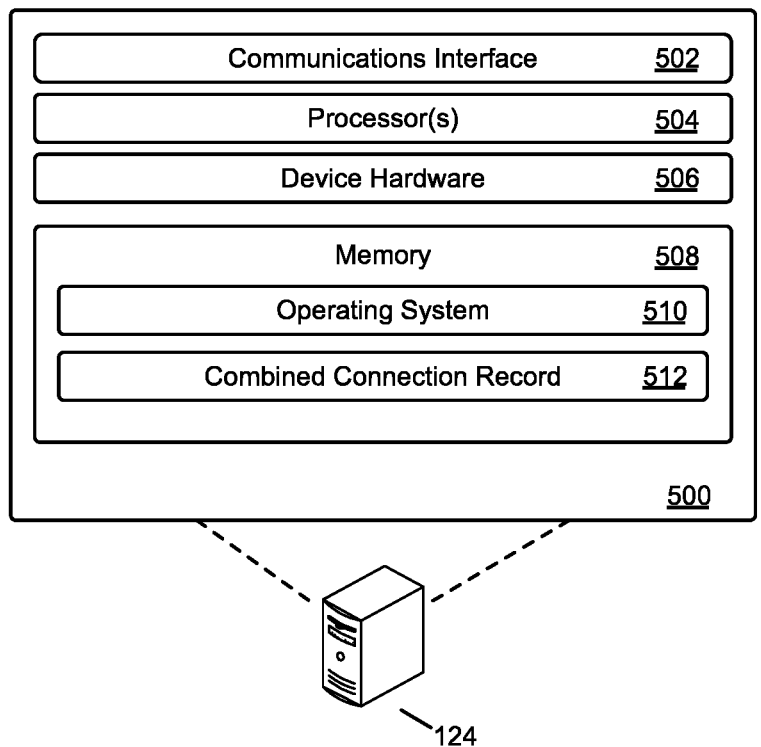
FIG. 5 is a block diagram showing various components of an example computing device implementing a Mobility Management Element (MME) that generates a combined access record.

FIG. 5 is a block diagram showing various components of an example computing device 500 implementing the MME 124. The computing device 500 may be a general-purpose computer, such as a desktop computer, tablet computer, laptop computer, server, or other electronic devices that are capable of receiving input, processing the input, and generating output data. The computing device 500 may also be a virtual computing device in the form of virtual machines or software containers that are hosted in a cloud.

The computing device 500 may be equipped with a communications interface 502, one or more processors 504, device hardware 506, and memory 508. The communications interface 502 may include wireless and/or wired communication components that enable the computing devices to transmit data to and receive data from other devices, whether through a dedicated wired connection or via a communications network. The device hardware 506 may include additional hardware that performs user interface, data display, data communication, data storage, and/or other server functions.

The memory 508 may be implemented using computer-readable medium, such as computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processor(s) 504 and the memory 508 of the computing device 500 may implement an operating system 510 and a combined access record 512. The operating system 510 may include components that enable the computing device 500 to receive and transmit data via various interfaces (e.g., user controls, communications interface, and/or memory input/output devices), as well as process data using the processor(s) 504 to generate output. The operating system 510 may include a presentation component that presents the output (e.g., display the data on an electronic display, store the data in memory, transmit the data to another electronic device, etc.). Additionally, the operating system 510 may include other components that perform various additional functions generally associated with an operating system.

The MME 124 is a component of the core network that is responsible for tracking the location of user devices and for part of the handover signaling between LTE and 2G/3G/5G networks. The MME 124 also receives wireless access records from various different base stations. The computing device 500 implementing the MME 124 stores the received wireless access records as the combined access record 512. The computing device 500 may provide the content of the combine access record 512 to a base station so the base station may determine whether a particular user device is a stationary device or mobile device.

Figure 6:
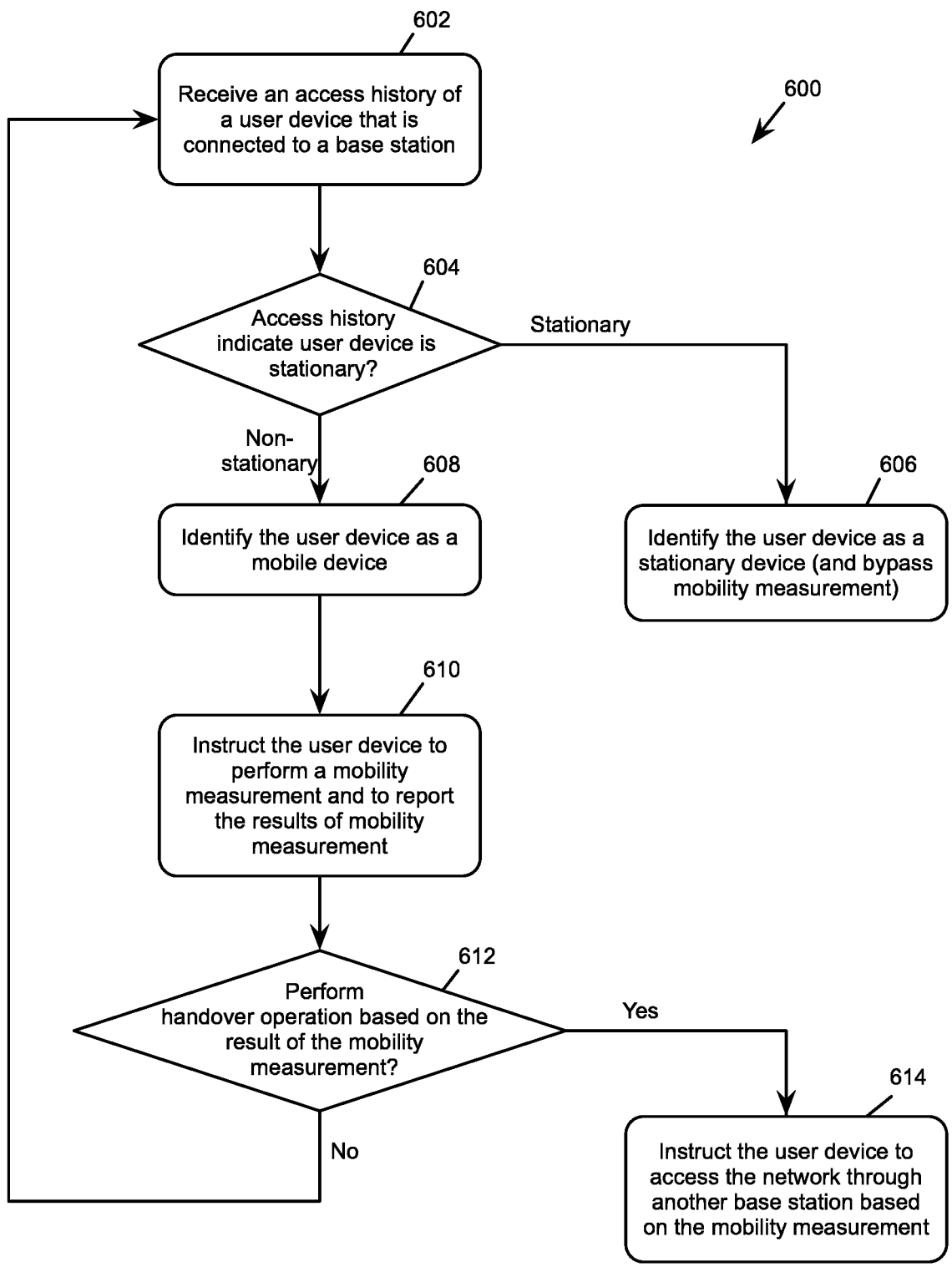
FIG. 6 conceptually illustrates a flow diagram of an example process for handling the handover of user devices between base stations.

FIG. 6 conceptually illustrates a flow diagram of an example process 600 for handling the handover of user devices between base stations. Specifically, a base station performs the process 600 to determine whether a user device is stationary or mobile based on the access history of the user device.

The process 600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 602, the base station receives the access history of a user device that is connected to the base station. The base station may maintain a wireless access record that tracks the connection histories of various user devices with the base station, including the access history of the user device. The base station may collect time stamps of when the user device is connected to the base station and of when the user device is disconnected from the base station. The collected time stamps are stored as part of the access history of the user device and as part of the wireless access record of the base station. The base station may also receive the identities of source and/or destination base stations of handover operations involving the user device. In some embodiments, the access history of the user device is provided by a component of the cellular network. For example, the MME of the cellular network may collect the wireless access records of different base stations and generate a combined access record. The base station may extract the access history of the user device from the combined access record.

At block 604, the base station uses the access history of the user device to determine whether the user device is stationary or mobile, i.e., non-stationary. The base station may determine that the user device is a stationary device if the access history shows that the user device has maintained continuous connection with the base station for over a threshold period of time. Alternatively, the base station may determine the user device is a stationary device if the access history shows that the user device is connected with the base station and no other base station within a threshold period of time. The base station may determine that the user device is a mobile device if the access history shows that the user device is in connection with one or more other base stations within a threshold period of time, or the user device has been in connection with the base station for only less than a threshold period of time. If the base station determines that the user device is stationary, the process proceeds to 606. If the base station determines that the user device is not stationary, the process proceeds to 608.

At block 606, the base station identifies the user device as a stationary device. In some embodiments, the base station bypasses mobility measurements for the identified stationary device by not instructing the user device to commence mobility measurement. In some embodiments, the base station issues a command to bypass or suppress the mobility measurement at the user device.

At block 608, the base station identifies the user device as a non-stationary device or a mobile device. At block 610, the base station instructs the user device to perform a mobility measurement and to report the results of the mobility measurement to the base station. The mobility measurement results include SNR or signal strengths of nearby base stations detected by the user device.

At block 612, the base station determines whether to perform handover operations based on the reported results of the mobility measurement. For example, if the reported measurement results indicate that another base station has a better SNR or signal strength than the base station, the base station may decide to perform handover operations. On the other hand, if the reported measurement results indicate that no other base station has a better SNR or signal strength than the base station, the base station may decide not to perform handover operations. The base station may further use other factors in conjunction with the measurement results to determine whether to perform the handover operations, factors such as the workload of the base station and the amount of data traffic between the core network and the base station. If the base station decides to perform the handover operation for the user device, the process proceeds to 614. If the base station decides not to perform the handover operation for the user device, the process returns to 602 to continue monitoring the user device.

At block 614, the base station instructs the user device to access the cellular network through another base station based on the received results of the mobility measurement. In other words, the current base station performs a handover operation that hands over the user device to the other base station.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A computing device comprising:
one or more processors; and
a computer-readable storage medium storing a plurality of computer-executable components that are executable by the one or more processors to perform a plurality of actions, the plurality of actions comprising:

receiving, at a particular base station of a cellular network, a record of a plurality of base stations of the cellular network being accessed by one or more user devices;

extracting from the record, a history of a first user device accessing the plurality of base stations;

when the history indicates that the first user device wirelessly connected with at least two different base stations within a first threshold period of time, commanding the first user device to perform a mobility measurement; and when the history indicates that the first user device wirelessly connected with the particular base station and no other base station within a second threshold period of time, commanding the first user device to bypass the mobility measurement.

2. The computing device of claim 1, wherein the first user device is a Long-Term Evolution Category M1 device that supports Internet of Things (IoT) applications.

3. The computing device of claim 1, wherein performing the mobility measurement comprises measuring signal strengths of one or more base stations at the first user device and reporting the measured signal strengths to the particular base station.

4. The computing device of claim 1, wherein the record comprises time stamps of the first user device accessing the plurality of base stations during an interval of time.

5. The computing device of claim 4, wherein the record further comprises time stamps of a second user device accessing the plurality of base stations during the interval of time.

6. The computing device of claim 1, wherein the record is received from a Mobility Management Element (MME) of the cellular network that tracks positions of the user devices.

7. The computing device of claim 6, wherein content of the record is collected from the plurality of base stations.

8. A computer-implemented method, comprising:

receiving, at a particular base station of a cellular network, a record of a plurality of base stations of the cellular network being accessed by one or more user devices;

extracting from the record, a history of a first user device accessing the plurality of base stations;

when the history indicates that the first user device wirelessly connected with at least two different base stations within a first threshold period of time, commanding the first user device to perform a mobility measurement; and when the history indicates that the first user device wirelessly connected with the particular base station and no other base station within a second threshold period of time, commanding the first user device to bypass the mobility measurement.

9. The computer-implemented method of claim 8, wherein performing the mobility measurement comprises measuring Signal-to-Noise Ratios (SNRs) of one or more base stations at the first user device and reporting the measured SNRs to the particular base station.

10. The computer-implemented method of claim 8, wherein the record comprises time stamps of the first user device accessing one or more base stations during an interval of time.

11. The computer-implemented method of claim 10, wherein the record further comprises time stamps of a second user device accessing the plurality of base stations during the interval of time.

12. The computer-implemented method of claim 8, wherein the record is received from a Mobility Management Element (MME) of the cellular network that tracks positions of the user devices.

13. The computer-implemented method of claim 8, wherein content of the record is collected from the plurality of base stations.

14. One or more non-transitory computer-readable media of a computing device storing computer-executable instructions that upon execution cause one or more processors to perform acts comprising:

receiving, at a particular base station of a cellular network, a record of a plurality of base stations of the cellular network being accessed by one or more user devices;

extracting from the record, a history of a first user device accessing the plurality of base stations;

when the history indicates that the first user device wirelessly connected with at least two different base stations within a first threshold period of time, commanding the first user device to perform a mobility measurement; and when the history indicates that the first user device wirelessly connected with the particular base station and no other base station within a second threshold period of time, commanding the first user device to bypass the mobility measurement.

15. The one or more non-transitory computer-readable media of claim 14, wherein the first user device is a Long-Term Evolution Category M1 device that supports Internet of Things (IoT) applications.

16. The one or more non-transitory computer-readable media of claim 14, wherein performing the mobility measurement comprises measuring signal strengths of one or more base stations at the first user device and reporting the measured signal strengths to the particular base station.

17. The one or more non-transitory computer-readable media of claim 14, wherein the record comprises time stamps of the first user device accessing the plurality of base stations during an interval of time.

18. The one or more non-transitory computer-readable media of claim 17, wherein the record further comprises time stamps of a second user device accessing the plurality of base stations during the interval of time.

19. The one or more non-transitory computer-readable media of claim 14, wherein the record is received from a Mobility Management Element (MME) of the cellular network that tracks positions of the user devices.

20. The one or more non-transitory computer-readable media of claim 14, wherein content of the record is collected from the plurality of base stations.

* * * * *